FIG. I

INVENTOR.
TAGE O. ANDERSON

BY Monte F. Mott
Gene E. Cox
ATTORNEYS

INVENTOR.
TAGE O. ANDERSON
BY [signature]
ATTORNEYS

INVENTOR.
TAGE O. ANDERSON
BY Monte F. Mott
G. T. McCoy
ATTORNEYS

Dec. 29, 1970 T. O. PAINE 3,551,816
ADMINISTRATOR OF THE NATIONAL AERONAUTICS
AND SPACE ADMINISTRATION
DIGITAL SYNCHRONIZER
Filed March 10, 1969 4 Sheets-Sheet 4

INVENTOR.
TAGE O. ANDERSON
BY Monte F. Mott
Alvin E. Gray
ATTORNEYS

United States Patent Office 3,551,816
Patented Dec. 29, 1970

3,551,816
DIGITAL SYNCHRONIZER

T. O. Paine, Administrator of the National Aeronautics and Space Administration, with respect to an invention of Tage O. Anderson, Arcadia, Calif. 91006

Filed Mar. 10, 1969, Ser. No. 805,406
Int. Cl. H04b 1/16; H04l 7/00
U.S. Cl. 325—325 11 Claims

ABSTRACT OF THE DISCLOSURE

A digital synchronizer for providing a bit clock for use as a bit sync signal in extracting binary data in a receiver of a PSK/PCM communication system. The synchronizer operates in the digital domain by summing digital samples produced from an analog noisy NRZ binary waveform which contains the data to be extracted. The samples are accumulated regarding sign, to form group sums which are then accumulated disregarding sign to provide sums of multigroup observation periods. The phase of the observation period having the largest digital value is used to obtain the phase of the first bit clock or bit sync signal, which is repeated at the bit rate.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

This invention generally relates to digital circuitry and, more particularly, to a digital bit synchronizer for providing a bit synchronizing signal for use in extracting binary data in a receiver of a phase-shift keying/pulse code modulated (PSK/PCM) communication system.

(2) Description of the prior art

The use of PSK/PCM techniques in data communication, particularly as related to telemetering data from a space, are well known in the art. Typically, in such a system, a subcarrier frequency is bi-phase modulated by a binary waveform, representing data in terms of ones and zeros. The subcarrier is assumed to be tracked by a phase-lock loop (PLL) in the receiver, wherein a local subcarrier frequency is available from a local subcarrier oscillator.

Under theoretical, ideal noiseless conditions, data could be extracted by multiplying the received bi-phase modulated subcarrier frequency with the local subcarrier frequency and hard limiting the product. However, in practice, the ever present noise, whose affect increases with increased telemetry distances, prevents such simple data extraction. Under low signal-to-noise ($S/N$) conditions, the product signal is a noisy non-return to zero (NRZ) binary waveform, which contains a random sequence of zeros and ones. These zeros and ones can only be extracted by generating a bit synchronizing signal, hereafter also referred to as a bit clock, which is in phase with the received noisy binary waveform, and by using the bit clock to define the locations of the various bits in the waveform. In practice, the derived bit clock is used to time a data detector whose output represents the ones and zeros of the telemetered data.

Herebefore, various techniques have been employed to locally generate the bit clock. Nearly all of these techniques, which utilize phase-lock loops, Costa's loops, squaring loops and the like, are based on analog operations, employing analog circuits with analog functional components. As is appreciated, analog circuits are very frequency dependent so that any change in frequency necessitates a change of the components. This results in the need for additional control functions which increase the overall circuit complexity. Furthermore, the analog circuits often require long periods to derive the necessary bit clocks which is a significant disadvantage. Another disadvantage of each of the prior art circuits for generating a bit clock is its limitation to operate on the signals supplied thereto in a single specified mode. This limits the flexibility with which the signals can be used to optimize the accuracy in the generation of the necessary bit clocks.

OBJECTS AND SUMMARY OF THE INVENTION

It is a primary object of this invention to provide a new improved bit synchronizer.

Another object of the present invention is to provide a bit synchronizer which generates necessary bit clocks by other than analog techniques.

A further object of the present invention is to provide a bit synchronizer capable of multimode performance in generating a bit clock for use in binary data extraction.

Still a further object is to provide a bit synchonizer for use in a receiving system of a PSK/PCM telemetry system, which is faster than prior art circuits, employed for the same purpose.

Yet a further object is to provide a relatively simple, fast, non-analog bit synchronizer for use in a PSK/PCM telemetry system, which is capable of being operated in more than one mode to provide the desired bit clock.

These and other objects of the invention are achieved by providing a circuit which operates in the digital domain, and one which is capable of operating in either of two modes with essentially the same circuit components. In the novel digital circuit of the present invention, which will hereafter be referred to as the digital bit synchronizer or DBS, the noisy, NRZ binary waveform, after appropriate low pass filtering, is sampled by a sample data system, to provide digital signals or samples representing analog samples from the waveform taken at the subcarrier frequency. All further processing to obtain the desired bit clock is performed in the digital domain.

Briefly, in either method which can be practiced with the DBS of the present invention, a certain amount of data, represented by digital samples, is analyzed and the best estimate of the correct phase relation between the subcarrier and stream of bits in the noisy NRZ binary waveform, converted into the digital samples, is derived through a maximum likelihood process. Once such an estimate has been derived it is used to provide a bit clock, followed by other bit clocks at the known bit rate, which is an integer multiple of the subcarrier frequency.

In either method of operation, digital samples are taken at the subcarrier frequency and cumulated, digitally integrated, in consecutive groups. Each group contains the same number of samples as there are subcarrier cycles per bit period. The digital integration of the samples within each group is performed regarding the sign (plus or minus) of each digital sample. Integrated digital values of successive groups are then added, disregarding sign, to form a running sum for a sequence of groups which together form an observation period. The number of groups within the observation period is a function of S/N ratio.

In one method, sums are generated for a succession of independent observation periods, equal in number to the number of subcarrier cycles per bit period. The start of each observation period is delayed by one sample from the end of the proceeding observation period. The observation period with the largest sum is used to provide the bit clock. In another method a single long observation period is employed and a plurality of successive running sums are accumulated. The number of sums equals the number of subcarrier cycles per bit period. Each sum in the succession starts with a sample succeeding the sample which is the first to be added in the preceding sum.

The use of either method enables one to extract maximum information from the received noisy NRZ binary waveform. The operation in the digital domain allows for extended storage time of the digital samples without degradation and further allows for further processing and manipulation of the samples to optimize the accuracy with which the bit clock is generated.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
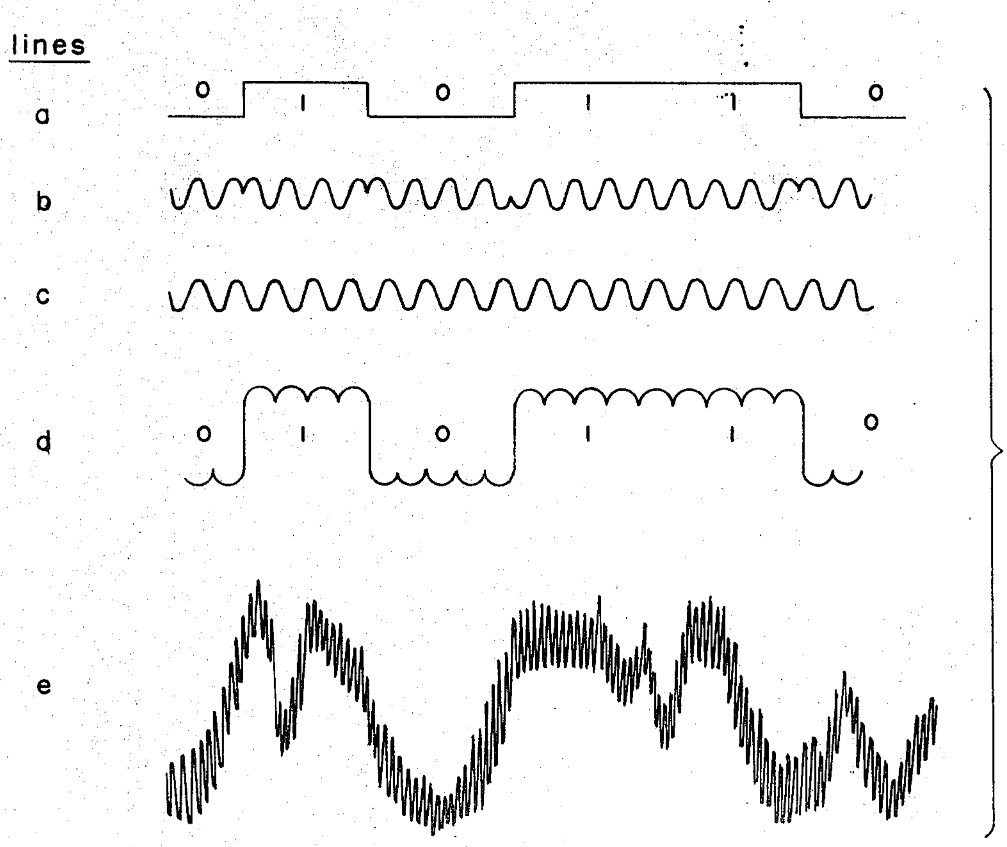
FIGS. 1 and 2 are multiline waveform diagrams useful in explaining the invention in general terms.

Before proceeding to describe the invention in detail, reference is first made to FIG. 1 wherein line *a* is used to diagram binary data, such as ones and zeros. Such data is used in PSK/PCM telemetry to bi-phase modulate a subcarrier frequency, such as is diagrammed in line *b*, for transmission purposes. If transmission conditions were ideal, namely, noise free, the bi-phase modulated subcarrier after separation from the carrier frequency in a receiver and multiplication by a locally generated phase-locked subcarrier frequency, such as diagrammed in line *c* would produce a binary waveform such as is shown in line *d*. Clearly, in such a waveform the transition between ones and zeros are easily seen so that the binary data could be easily extracted. In reality however, due to the ever present noise which increases with increased communication distances, the produced signal is a noisy, generally NRZ, binary waveform as shown in line *e*. From such a waveform the original binary data cannot be extracted without a proper bit synchronizing signal or bit clock. The present invention is directed to provide such a bit clock. The present invention is assumed to be supplied with a signal of a noisy NRZ binary waveform such as shown in line *e*, and the locally generated subcarrier frequency, such as shown in line *c*. These signals are utilized in a manner to be described in detail.

Figure 2:
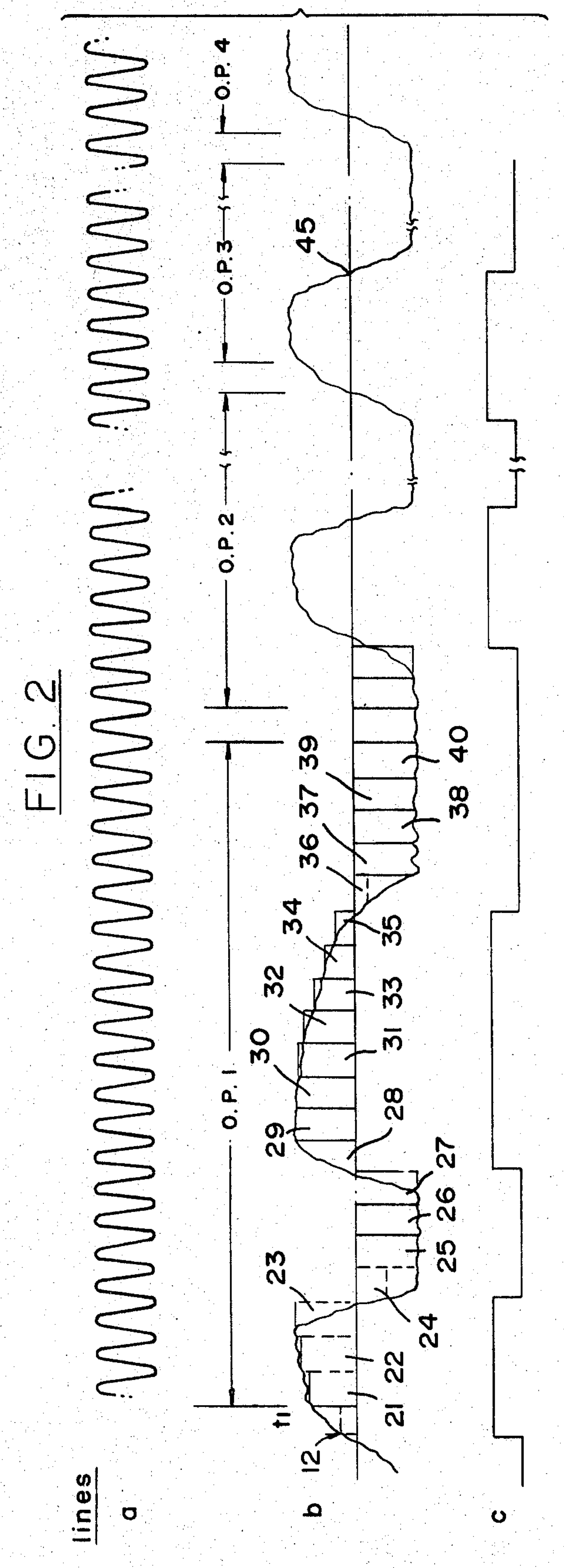

Waveforms of the signals which are supplied to the digital bit synchronizer (DBS) of the present invention are diagrammed in enlarged form in lines *a* and *b* of FIG. 2, which will be used to explain the invention. Line *c* represents data (one and zeros) in the noisy NRZ binary waveform of line *b*. In FIG. 2 it is assumed that each bit period comprises four subcarrier cycles. The waveform shown in line *b* more closely resembles an ideal waveform in order to simplify the following description.

Basically, in accordance with the present invention, starting at an arbitrary phase, such as *t*1, the signal of the noisy binary waveform, designated in line *b* of FIG. 2 by numeral 12, is digitized at the subcarrier rate or frequency to provide digital samples. In line *b* of FIG. 2, numerals 21–40 represent successive digital samples produced at the subcarrier frequency, with samples above a reference line 45 assumed to have plus signs and those below it, minus signs.

In one method, performed by the present invention, with a bit time of four subcarrier cycles, the first four samples such as 21–24 representing a first group G1 of a bit period duration, are digitally integrated, regarding sign, to provide a bit value. In the diagrammed example, the first bit value comprises the digital sum of positive samples 21, 22, and 23 and negative sample 24. The first bit value of G1 is temporarily stored while the bit value of the next four digital samples such as 25–28, representing G2, is accumulated to form a second bit value which is added to the first, disregarding sign. This process is repeated for a number of groups which is a function of noise conditions, the higher the noise, the larger the number of groups. In FIG. 2, it is assumed that the bit values of five successive groups G1–G5 are added to form a total sum for a first observation period, designated O.P.1. The total sum is the total sum of the bit values of the 5 groups disregarding sign.

The sum for O.P.1 is compared with the sum derived from a preceding observation period and the larger sum is temporarily stored. Since O.P.1 is the first observation period its sum is the largest so that it is temporarily stored, and samples forming groups of a succeeding observation period, O.P.2 are integrated per group to provide bit values which are summed to provide the total sum of O.P.2. O.P.2 starts one subcarrier cycle after the end of O.P.1. At the end of O.P.2 its total sum is compared with that of $O \cdot P \cdot 1$ and the larger of the two is stored, as well as an indication which observation period provided the largest sum, while samples for O.P.3 are accumulated.

This process is repeated for a number of observation periods, equal to the number of subcarrier cycles per bit, which in the diagrammed example of FIG. 2 is four. At the end of O.P.4, the phase relation of the binary waveform and the subcarrier oscillator at the start point of the observation period with the largest sum is used to provide the desired clock bit. Once established, the derived clock bit is repeated each four cycles of the subcarrier until a new phase relation is chosen to generate a new bit clock.

Figure 3:
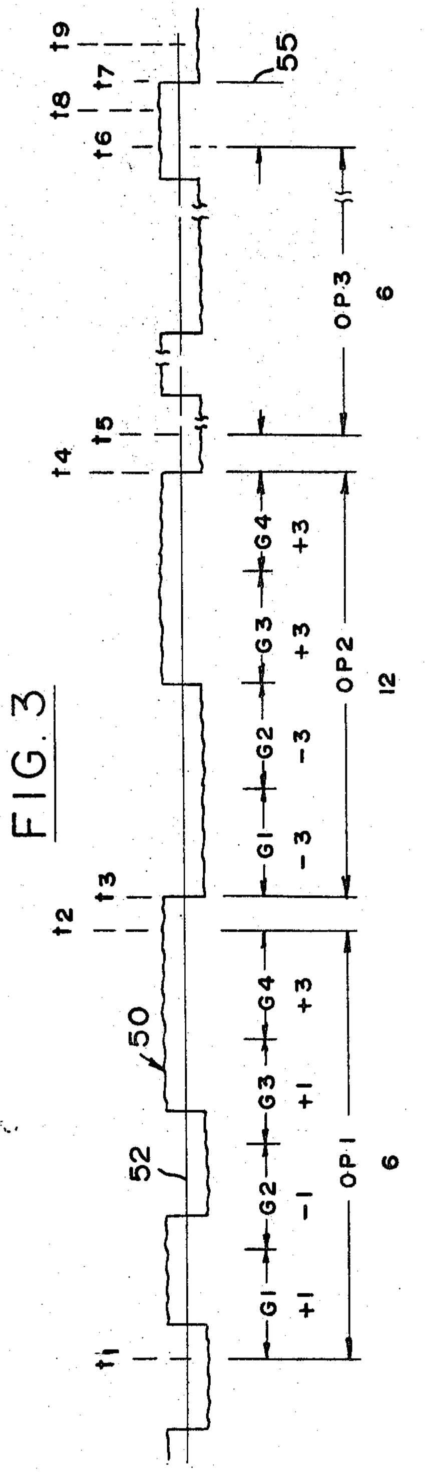
FIG. 3 is a diagram useful in explaining the embodiment of the invention shown in FIG. 4.

The foregoing description may be summarized in connection with a simplified example which is diagrammed in FIG. 3 wherein the waveform 50 represents an idealized binary waveform from which samples are taken with respect to a reference level 52. Therein each bit period is assured to consist of three subcarrier cycles, so that only three observation periods are needed. Noise is assumed to be low so that each observation period only includes four groups G1–G4. In FIG. 3, each positive sample is assumed to be a plus one (+1) and a negative sample a minus one (−1).

O.P.1 is assumed to start at an arbitrary time *t*1 and end at *t*2. The bit values for G1–G4 of O.P.1 which are formed by accumulating three samples for each group, regarding sample sign, are +1, −1, +1 and +3, respectively. These bit values are accumulated disregarding sign to provide a total sum of 6 for O.P.1. O.P.2 is shown starting at $t3$, one subcarrier cycle after $t2$ and ending at $t4$. The total sum of O.P.2 is 12, which is greater than the sum 6 of O.P.1. Thus, after $t4$, the fact that the sum of O.P.2 is greater than that of O.P.1 is retained as well as the sum itself O.P.3 starts at $t5$ and ends at $t6$ when the sum of 6 of O.P.3 is compared with the stored sum 12 of O.P.2. However, since 12>6, O.P.2 is found to have the largest sum. Consequently, at time $t7$ or two subcarrier cycles after $t6$ is a bit clock designated 55 supplied by the DBS. Briefly stated, the bit clock (55) is provided after the end ($t6$) of the last observation period (O.P.3) at a time ($t7$) which is $m \cdot x$ subcarrier cycles after the start ($t3$) of the largest observation period (O.P.2), where $m$ is the number of cycles (3) per bit period and $x$ is an integer. Had the largest sum been accumulated during O.P.1 the bit clock would have been provided at $t8$, one cycle after $t6$. Similarly, if the largest sum would have been accumulated during O.P.3, the bit clock 55 would have been provided at $t9$, three subcarrier cycles after $t6$. Once the first bit clock is generated, it is repeated at the bit rate which in the present example is 1/3 of the subcarrier frequency or after every three subcarrier cycles.

Figure 4:
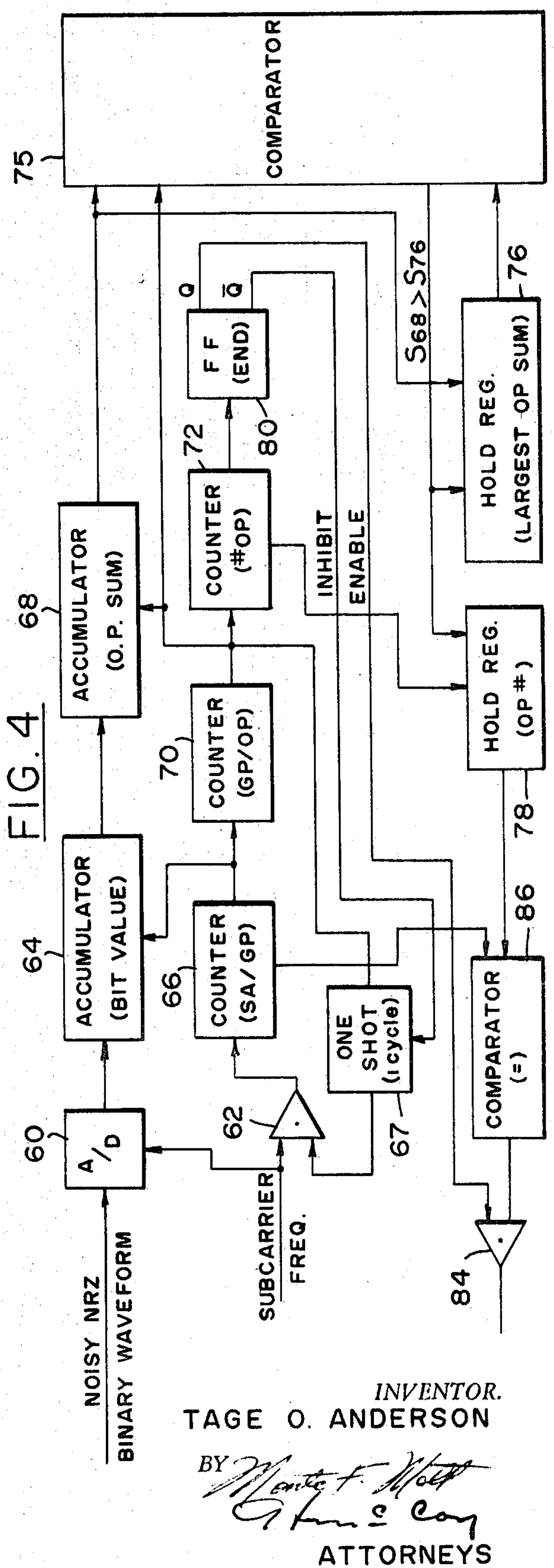
FIG. 4 is a block diagram of one embodiment of the invention.

Reference is now made to FIG. 4 which is a simple block diagram of one embodiment of the DBS of the present invention designed to generate the bit clock as herebefore explained in connection with FIGS. 2 and 3. Therein numeral 60 represents an analog-to-digital (A/D) converter to which the noisy NRZ binary waveform (such as shown in line $b$ of FIG. 2 or waveform 50 of FIG. 3) is supplied. The converter 60 and an AND gate 62 are supplied with the subcarrier frequency of the local subcarrier oscillator in the receiver, so that the converter 60 is activated once per subcarrier cycle to produce a digital sample (such as samples 21-40 in FIG. 2). Each digital sample is accumulated in an accumulator 64, which regards sample sign and provides a bit value. The number of samples accumulated or integrated by accumulator 64 depends on the number of samples per group which are counted by a counter 66. As previously stated, the number of samples per group (SA/GP) equals the number of subcarrier cycles per bit period. Counter 66 is connected to the output of gate 62 which provides an incrementing pulse to the counter once per subcarrier cycle unless inhibited by a one shot 67 whose function will be explained hereafter. Briefly stated however, the function of the one shot 67 is to produce the necessary one cycle delay between successive observation periods.

For the example shown in FIG. 3, counter 66 counts up to three samples, representing a full group, such as G1. When a full count is reached therein it enables accumulator 64 to transfer the bit value accumulated therein to an accumulator 68 and is reset to count the number of cycles defining the next group. The output of counter 66 is also used to increment a succeeding counter 70 which counts the number of groups per observation period (GP/OP), and at the end of each period increments a counter 72 whose count represents the number of the last complete observation period. For the FIG. 3 example, counter 70 counts the four groups (G1–G4) per observation period.

During O.P.1 at the end of each group, such as G1, the bit value, accumulated in 64, such as +1, is transferred to accumulator 68, which adds the bit values disregarding sign. Then, at the end of G4, which is the last group of O.P.1 counter 70 increments counter 72 to store a one (1) count. At the same time counter 70 activates accumulator 68 to provide the total sum of O.P.1 to a comparator 75, which is activated at the end of each observation period by the output of counter 70. Comparator 75 compares the total sum output of accumulator 68 with a sum held in a hold register 76, and provides an enabling signal to hold register 76 and to a hold register 78 when the sum of accumulator 68, desginated $S_{68}$, is greater than the sum in register 76, designated $S_{76}$. When register 76 is enabled it stores the sum, supplied thereto from accumulator 68, while register 78, when enabled, stores the observation period number, supplied thereto from counter 72.

Relating the circuitry, so far described, to the example diagrammed in FIG. 3, at the end of O.P.1 at $t2$, the counter 70 activates accumulator 68 to supply the total sum 6 to activated comparator 75. The latter compares the 6 with the sum from register 76 which each zero (0) since O.P.1 is the first observation period. Since 6>0, an enabling signal is supplied by the comparator, resulting in the sum 6 being stored in register 76, and the number 1 from counter 72, which counts the observation period number, being stored in register 78.

At the end of O.P.1 at $t2$ the one shot 67 is triggered by the output of counter 70 to provide an inhibiting signal to gate 62 to prevent the signal from the subcarrier oscillator to increment the counter 66 and thereby prevent the start of O.P.2 until $t3$. Thus, the one shot 67 provides the necessary one cycle delay between successive observation periods.

During O.P.2 the process of accumulating in accumulator 64 a bit value for each group, and of accumulating an O·P·2 total sum in accumulator 68 proceeds, while the total sum 6 of O.P.1 is stored in register 76 and the number 1 of O.P.1 is held in register 78. At the end of O.P.2 at $t4$ the number in counter 72 is increased to 2 and the total sum 12 of O.P.2 is compared by comparator 75 with the sum 6 in register 76. Since 12>6 an enabling signal is provided by comparator 75, causing register 76 to store the sum 12 from accumulator 68. Also, register 78 stores the number 2, supplied thereto from counter 72.

At the end of O.P.2 the one shot 67 is again enabled to inhibit the start of O.P.3 by one cycle until time $t5$. At the end of O.P.3 counter 72 is incremented to a count of 3 which is the maximum number of required observation periods in the particular example, thereby indicating an end of an observation cycle. The output of counter 72 is used to switch the state of a bistable element, such as flip-flop (FF) 80, which is assumed to be in a reset state during the observation cycle. At the end of the cycle the output of counter 72 switches the FF80 to its set state. When set, the Q and $\overline{Q}$ outputs of FF80 are true and false, respectively. The true level of output Q is assumed to provide an enabling signal to an AND gate 84, while the false level of $\overline{Q}$ serves as an inhibit signal to the one shot, to prevent it from further inhibiting the gate 62. As a result, each cycle from the subcarrier oscillator increments counter 66.

At the end of O.P.3 the total sum 6, accumulated in accumulator 68, is compared in comparator 75 with the sum 12 from register 76. Since 6 is less, rather than greater, than 12, the comparator 75 does not enable registers 76 and 78. Consequently, the respective numbers 12 and 2 remain stored therein. At the end of O.P.3 at $t6$ the count in counter 66 is 3, representing the third sample of G4 in O.P.3. Thereafter, one cycle from the subcarrier is supplied to the counter 66 through gate 62 so that at time $t8$ the count is a 1 and one cycle later at $t7$ the count is 2. The outputs of counter 66 and register 76 are supplied to a comparator 86 which provides a true output to gate 84 whenever its two inputs are equal. Thus, since register 78 stores a number 2, at $t7$, when the counter 66 stores or contains a 2, comparator 86 provides a true signal to gate 84. Since, after O.P.3 the other input to gate 84 from FF80 is also true, the gate 84 provides a true output at time $t7$, which represents the bit clock.

This bit clock is repeatedly provided every bit period such as three cycles since in the particular example every three cycles the 3-count counter 68 stores a number 2. It is these bit clocks that are used to extract the binary data from the noisy binary waveform. For example, each of the bit clocks from gate 84 may be used to activate the accumulator 64, instead of the output of counter 66, so that each time a clock bit is provided the output of the accumulator represents the integrated output of three digital samples representing a bit period. Since the present invention is directed to generating the bit clocks, the manner in which they are used will not be described in any further detail.

From the foregoing description it should be appreciated that the observation cycle, during which samples are taken and operated upon to derive or generate the bit clock, such as the observation cycle *t1–t6*, shown in FIG. 3, is divided into a number of observation periods, equal in number to the number of phases, between the subcarrier frequency and the noisy binary waveform. The number of phases equals the number of subcarrier cycles per bit period, which in FIG. 3 is assumed to be three. The start of each observation period is delayed by one cycle from the end of the preceding observation period. The data or samples which are integrated and accumulated during each observation period is entirely separate and independent from the samples, integrated and accumulated in every other observation period. For example, in O.P.1 samples from waveform 50, produced during *t*1 through *t*2, are operated upon, while during O.P.2 distinct samples, produced during *t*3 through *t*4, are operated upon.

Figure 5:
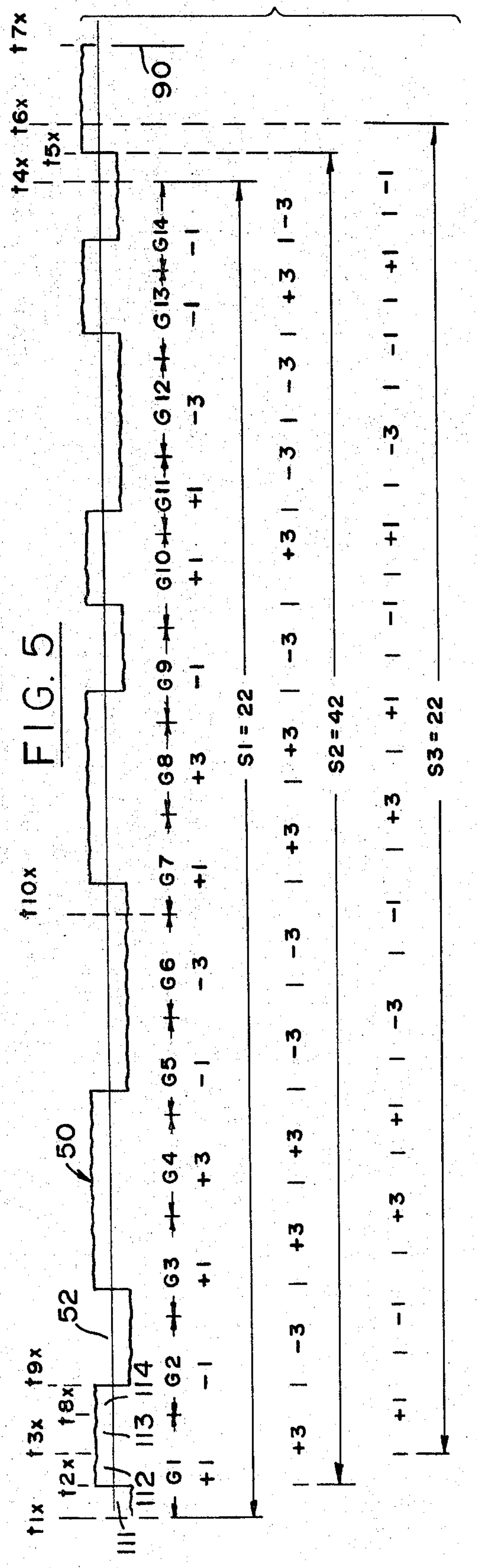
FIG. 5 is a diagram useful in explaining the embodiment of the invention shown in FIG. 6.

Such a technique or mode of deriving the first bit clock 55 represents one mode of operation of the present invention which is in contrast with another, second mode of operation. The second mode will be described hereafter in connection with FIGS. 5 and 6. Attention is first directed to FIG. 5 wherein the waveform is again diagrammed in order to explain the second mode of operation of the the system of the present invention. In the second mode of operation, like in the first mode, successive samples are divided into groups, each group containing a number of samples equal to the number of subcarrier cycles per bit period, such as three. The samples in each group are integrated or accumulated regarding sign to provide a bit value and the bit values are added or accumulated disregarding sign to provide a total sum. In FIG. 5, it is assumed that the number of groups is 14 (G1–G14). In the diagrammed example the first sum S1 which equals 22 is provided by operating upon samples produced from *t*1*x* to *t*4*x*, with the first sample of the first group G1 being produced at *t*1*x*.

A second sum S2 is produced by operating on an equal number of samples and groups, starting one subcarrier after the start of the first sample of the preceding sum, i.e., at a time *t*2*x*, and ending at *t*5*x*. The third sum S3 is provided from samples starting with a first sample starting at time *t*3*x*, which is one subcarrier cycle period after *t*2*x*. S3 terminates at *t*6*x*. After *t*6*x*, representing the end of the observation cycle, the largest sum is determined and the phase of the first sample, used to provide such a sum, is used in deriving the first bit clock. In the example, since the largest sum 42 is provided by the second sum S2, the first bit clock 90 (see FIG. 5) is provided at time *t*7*x* which is two subcarrier cycle periods after *t*6*x*. Again, the bit clock is provided $m \cdot x$ subcarrier cycle periods after the start of the first sample providing the largest sum.

Figure 6:
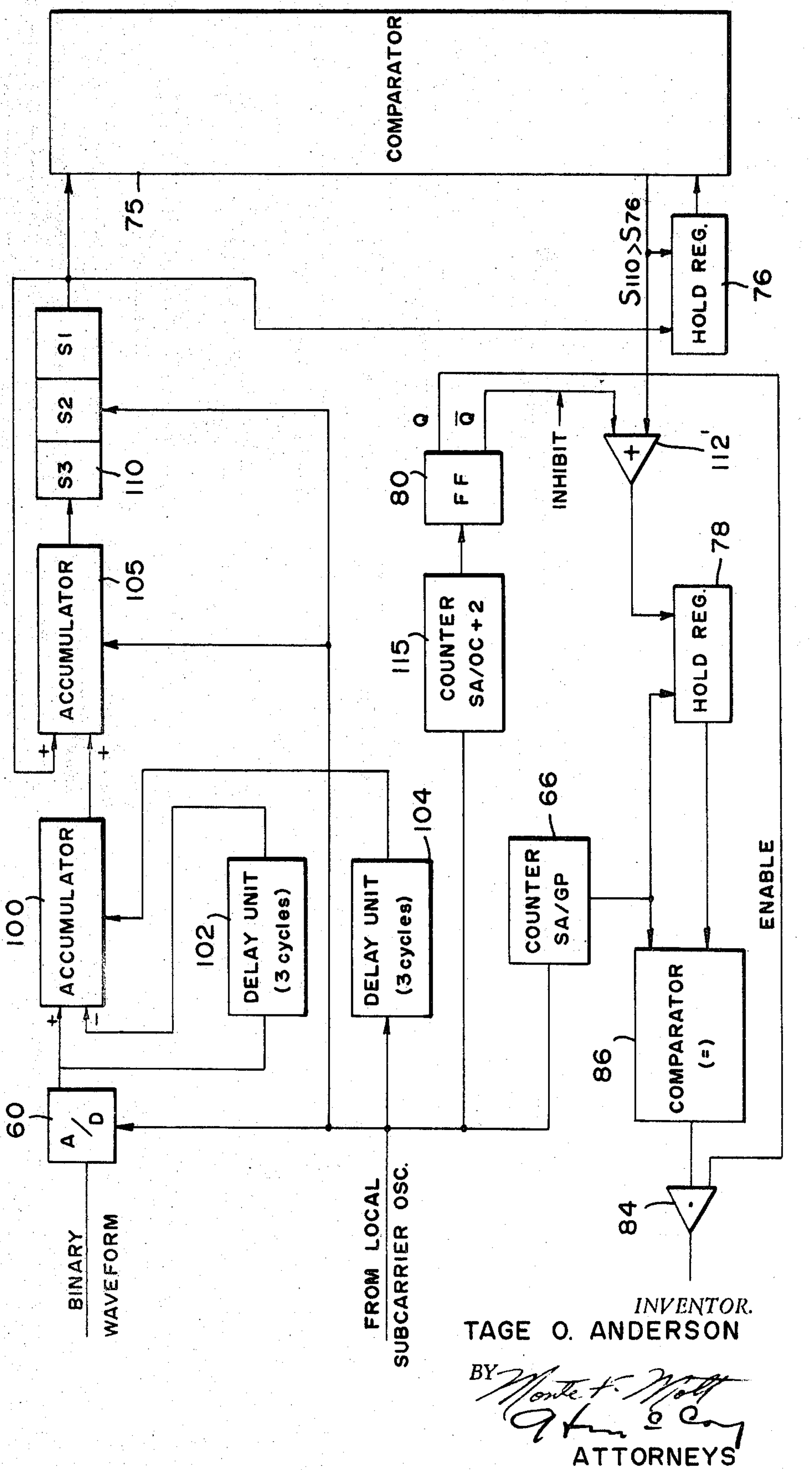
FIG. 6 is a block diagram of another embodiment of the invention.

It should be appreciated to those familiar with the art of digital circuit design, that various circuit arrangements may be employed to provide the bit clock in accordance with the method, herebefore explained in connection with FIG. 5. It should further be appreciated that in the latter-mentioned method digital samples per group are accumulated regarding sign to provide bit values. These values are then accumulated to provide total sums, and the start phase or address of the largest sum is used in generating the desired bit clock. Many of the circuit components, shown in FIG. 4, may be incorporated in implementing the circuit arrangement or system, necessary to practice the second method. One example of such a system is diagrammed in FIG. 6, to which reference is now made. In FIG. 6 elements like those previously described are designated by like numerals.

As may be seen from FIG. 6 the A/D converter 60 operates, as in the system shown in FIG. 4, to provide a digital sample for every cycle of the subcarrier oscillator output signal. Each sample from 60 is supplied to a plus (+) input of an accumulator 100 and to a delay unit 102, which for the example of FIG. 5 provides a 3-cycle delay, representing a bit period. The output of unit 102 is supplied to the minus (−) input of accumulator 100. The latter is activated by the output of another 3-cycle delay unit 104, which is supplied with the output of the subcarrier oscillator. Units 102 and 104 may comprise 3-bit shift registers.

The function of accumulator 100 is similar to that of accumulator 64 in FIG. 4. That is, it integrates or accumulates three digital samples, regarding sign, and, when activated by an enabling signal (from unit 102), provides a bit value to an accumulator 105. As connected, starting with the sample provided at *t*1*x*, accumulator 100 integrates the first three samples designated in FIG. 5 by 111, 112 and 113, supplied thereto at *t*1*x*, *t*2*x* and *t*3*x*, respectively. Samples 111, 112 and 113 are assumed to be −1, +1 and +1, respectively with respect to reference line 52. At time *t*8*x* accumulator 100 is enabled by the output of unit 102 to supply an accumulator 105 with the integrated sum of the three samples, representing a bit value of +1, which is the first bit value of sum S1. Then, the first sample 111 of −1 from unit 102 is subtracted by the accumulator 100 and the next sample 114 of +1, supplied from converter 60, is added. Consequently, at time *t*9*x* the accumulator 100 provides accumulator 105 with the first bit value of +3 (the sum of samples 112, 113 and 114), which is the first bit value of sum S2. This process is repeated once per subcarrier cycle so that each cycle the accumulator 100 provides the bit value of another of the three sums S1–S3.

The accumulator 105 receives the bit value, accumulated by accumulator 100, and adds to it a sum supplied thereto from the output of a recirculating register 110. For the example diagrammed in FIG. 5, the register 110 is a three stage register. Each stage is used to store another of the sums S1–S3 as they are accumulated during the observation cycle. In FIG. 6, the register 110 is shown with its output stage storing S1, in which case accumulator 100 would provide accumulator 105 with a bit value for one of the groups which are used in the accumulation of S1. Let it be assumed, for example, that the stage, diagrammed in FIG. 5 corresponds to a time *t*10*x*. In this case the sum supplied to accumulator 105 from register 110 is seven (7), representing the sum of groups G1–G5 for S1, while accumulator 100 provides a bit value of −3 for G6. These two numbers (7 and 3) are accumulated by accumulator 105 to store a number 10 in the input stage, as the partial sums of S3 and S2 are shifted to the right.

From the foregoing it should thus be appreciated that each of the stages of register 110 contains a running partial sum for a different one of the sums S1–S3. The output of register 110 is supplied to comparator 75, each cycle of the output signal of the subcarrier oscillator, and is compared with the sum in hold register 76, as herebefore explained. When the output of register 110, designated $S_{110}$, is greater than $S_{76}$ the comparator 75 provides an enabling signal to register 76, and through a gate 112′, which is enabled when FF80 is reset, to hold register 78. When enabled, register 76 stores the sum supplied thereto from register 110, and register 78 stores the number in counter 66, which in the present example counts the 3 cycles per bit period.

The system shown in FIG. 6 further includes a counter 115 which counts the total number of samples or subcarrier cycles per observation cycle (42 in the example of FIG. 5) plus two. The additional two counts are needed to insure that FF80, indicating the end of the observation cycle, is set at time $t6x$ when the last sum S3 is completed rather than at time $t4x$ when the first sum S1 is completed. After the count in counter 115 is a maximum FF80 is set, inhibiting gate 112' and enabling gate 84. For the particular example, at this point in the operation the count in counter 66 is 3 and the number in register 78 is 2. This number was stored in register 78 at time $t5x$ when the count in counter 66 was 2, and S2 having a sum of 42 was found by comparator 75 to be greater than S1 with a sum 22. Since at $t6x$ the number 2 in register 78 and the number 3 in counter 66 are not the same comparator 86 does not provide an output. However, two cycles later, at $t7x$ the count in counter 66 is 2, matching the number 2 in register 78. Consequently, comparator 86 provides a true output which causes enabled gate 84 to provide an output, repressenting the first bit clock 90. Subsequent bit blocks are provided every three subcarrier cycles, at the bit rate.

From the foregoing it should be appreciated that even though the two modes of deriving the desired bit clock are significantly different, similar digital circuits are employed to practice either mode of operation. In the first mode, or mode I, each bit value is generated by data or samples entirely independent from those used to generate other bit values. On the other hand, in mode II the samples for each bit value are not independent. In mode I less data (such as four groups) is used to form each sum, whereas in mode II more data (fourteen groups) is used to form each sum. However, in mode II the used data is common between the various sums. It should be appreciated that even though in various examples, herebefore used, bit periods were assumed to comprise three or four subcarrier cycles, in practice the number of cycles, generally designated *m*, is much greater. Also, it should be appreciated that the actual number of groups, generally designated *n*, used to form each of the sums in either mode, depends on noise conditions, the number of groups increasing with increased noise.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A circuit comprising:

first accumulator means to which digital samples are supplied at a selected rate for accumulating groups of signals to provide a digital output for each group;

second accumulator means coupled to said first accumulator means for accumulating the digital outputs of said first accumulator means to provide a plurality of sums of digital outputs;

means for comparing said sums to select the largest of said sums;

means for storing an indication related to a phase relationship of the first sample used by said first accumulator means to provide the first digtal output included in said largest sum; and output means for providing an output at a time which is a function of the indication in said storing means.

2. A circuit as described in claim 1 wherein each of said digital samples defines a magnitude and sign with respect to a reference level, each group includes *m* samples and said first accumulator means integrates for each group the *m* samples thereof to provide a digital output which is a function of the magnitudes and signs of said *m* samples, and said second accumulator means accumulates *n* digital outputs to provide a sum which is a function of only the magnitudes of said *n* digital outputs.

3. A circuit as described in claim 2 wherein said system includes analog to digital converting means to which a noise-distorted analog signal which is amplitude modulated by bits of data in the form of ones and zeros is supplied, a one bit being represented by a signal amplitude having a first polarity with respect to a reference level, and a zero bit being represented by a signal amplitude having a second polarity, opposite said first polarity, with respect to said reference signal, each bit having a bit period which is equal to $mz$, where $z$ is the duration of one cycle of the output of an oscillator of a fixed preselected frequency, and means for activating said digital converting means with the output of said oscillator to provide, during each cycle of the output of said oscillator, a digital sample as a function of the amplitude and polarity of the analog signal supplied thereto during said cycle.

4. A circuit as described in claim 3 wherein said circuit includes accumulator control means for controlling said first and second accumulator means to provide a sequence of *m* sums, each sum consisting the sum of *y* digital outputs from said first accumulator means, *y* being less than *n* and being selected as a function of the noise, distorting said analog signal.

5. A circuit as described in claim 3 wherein said accumulator control means control said first and second accumulator means so that each of said *m* sums is a function of distinct and independent $m \cdot y$ digital samples from said analog to digital control means, the first sum being a function of the first $m \cdot y$ digital samples, and each succeeding sum is a function of different $m \cdot y$ digital samples separated by a single subcarrier cycle duration from preceding $m \cdot y$ samples used in forming a preceding sum.

6. A circuit as described in claim 3 wherein said accumulator control means control said first and second accumulator means so that the first *m* of said digtal samples comprise the first samples of the samples used to provide said *m* sums, with the first sample for each sum being delayed by one cycle period from the first sample used in deriving a preceding sum.

7. For use in a receiver of a communication system of the type wherein binary data in the form of ones and zeros is communicated to the receiver as a noise distorted bi-phase modulated subcarrier frequency of *x* c.p.s., the bit rate being $x/m$ bits per second, *m* being an integer representing the number of subcarrier cycles per bit, said receiver including a local subcarrier oscillator for providing an output at said *x* c.p.s., which is phase-locked by a phase-lock loop to said received bi-phase modulated subcarrier frequency, said receiver further including means for multiplying said bi-phase modulated subcarrier frequency by said local subcarrier output to provide a noise-distorted amplitude-modulated binary waveform, a digital bit synchronizer for providing a bit clock for use in the extraction of the binary data from said binary waveform, said digital bit synchronizer comprising:

first means for providing converting said amplitude modulated binary waveform into digital samples at a rate equal to *x* samples per second;

first accumulating means for accumulating successive groups, each of *m* digital samples as a function of their amplitudes and polarities to provide for each group a bit value;

second accumulating means coupled to said first accumulator means to accumulate bit values of *m* group sequences each sequence being of *y* successive groups to form a total sum for each sequence of groups, said bit values being accumulated as a function of their magnitudes;

comparing means coupled to said second accumulating means for determining the sequence out of said *m* sequences having the largest sum; and output means coupled to said comparing means for providing a bit clock at a period after the last sequence which is a function of the group sequence with the largest sum.

8. A circuit as described in claim 6 wherein the group sequence with the largest sum is definable as the $i^{th}$ group sequence $1<i<m$ and said output means include means for providing said bit clock, *i* subcarrier cycles after the sum for the last group of the last sequence is derived.

9. A circuit as described in claim 7 wherein said second accumulating means provide in succession $m$ sums for said $m$ group sequences, the sum for each group sequence being a function of independent and separate $m \cdot y$ digital samples, with samples forming different sums being separated by one subcarrier cycle duration.

10. A circuit as described in claim 7 wherein said second accumulating means provide in succession $m$ sums for said $m$ group sequences.

11. A circuit as described in claim 10 wherein said output means includes a $m$-number counter incremented by every cycle of the output of said local subcarrier oscillator and register means coupled to said counter and to said comparing means for transferring to said register the count in said counter whenever a last produced sum is greater than a prior produced sum, and said output means further include compare and gating means for providing, after said second accumulating means produce the last of said $m$ sums, a bit clock output signal when the numbers in said register and said counter are the same.

References Cited

UNITED STATES PATENTS

| | | | |
|---|---|---|---|
| 3,182,127 | 5/1965 | Wiese | 340—146.1d |
| 3,407,356 | 10/1968 | Meranda | 328—72 |
| 3,437,937 | 4/1969 | Warfield | 325—321 |

RICHARD MURRAY, Primary Examiner

ALBERT J. MAYER, Assistant Examiner

U.S. CL. X.R.

325—322, 323, 324, 325; 178—69.5; 328—155, 72; 340—146.1d, 168